May 15, 1962    R. L. CRANE ET AL    3,034,779
VISE STRUCTURE FOR MACHINE TOOLS
Original Filed Nov. 14, 1957    3 Sheets-Sheet 3
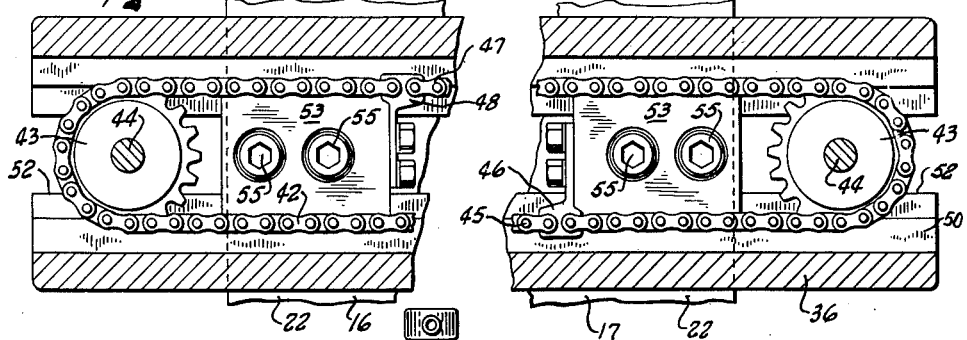
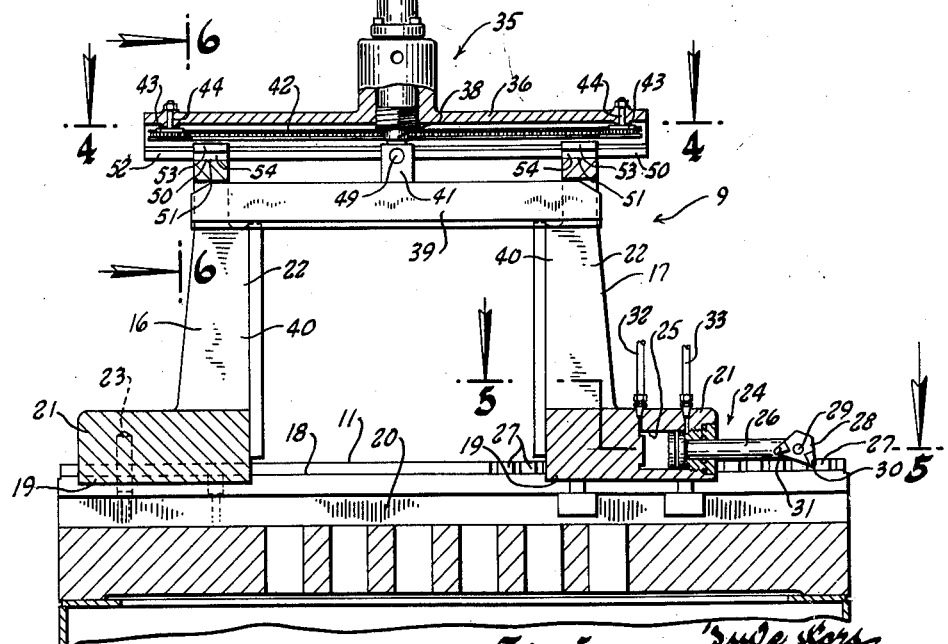
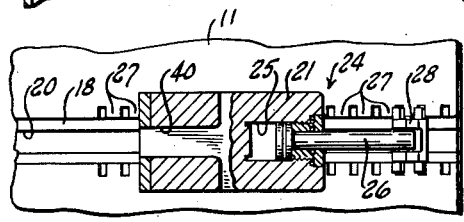

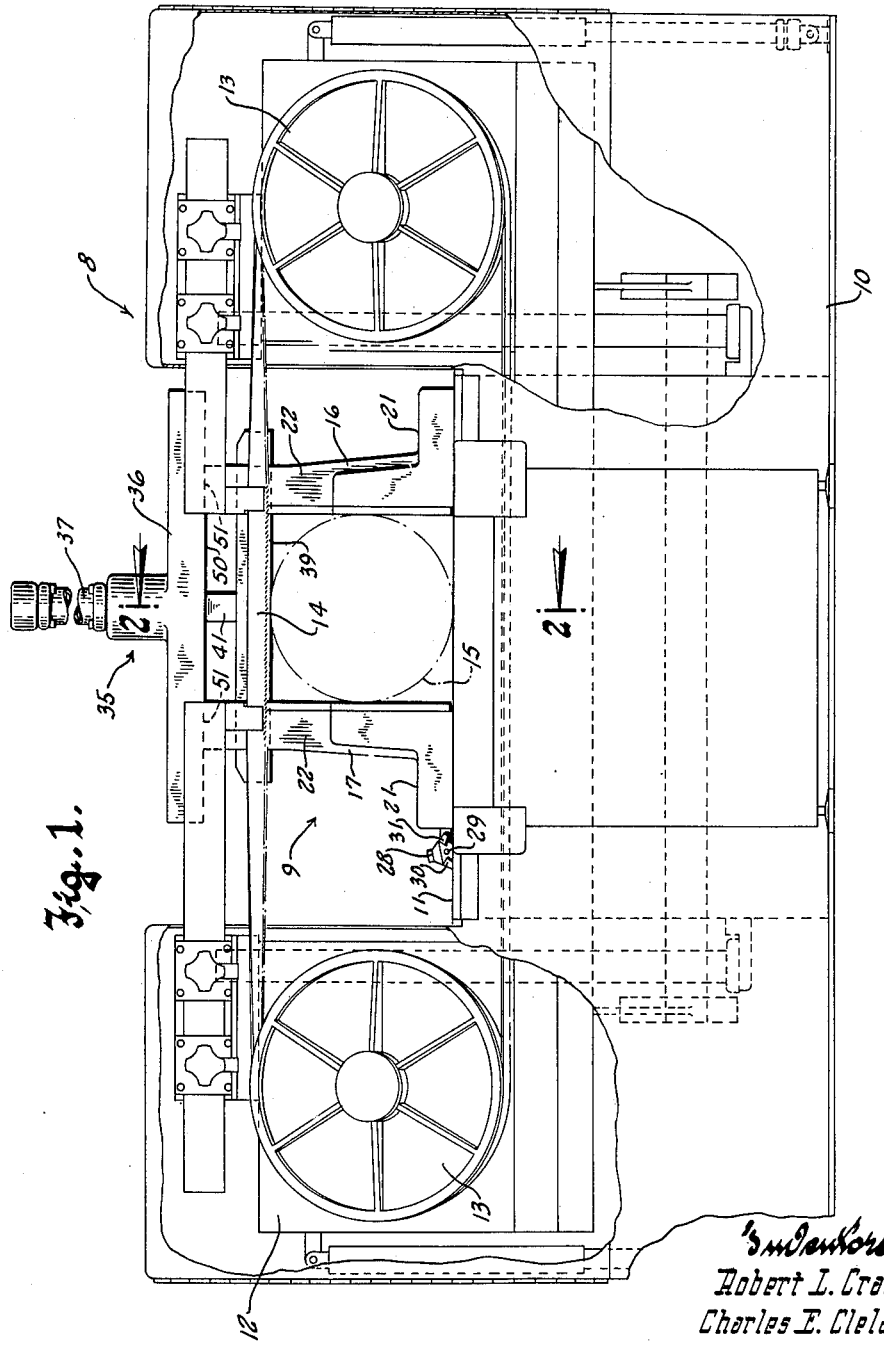

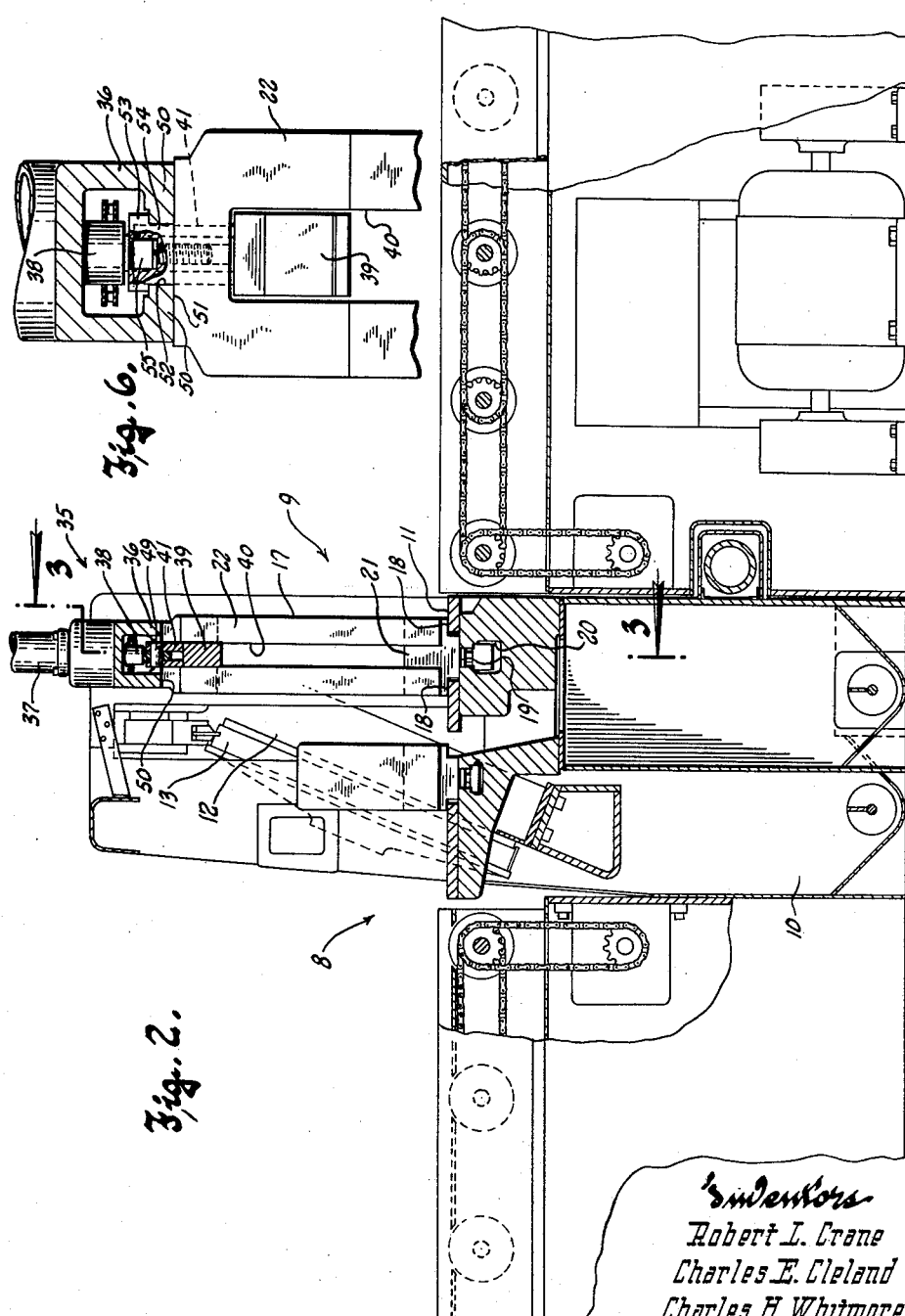

United States Patent Office 3,034,779
Patented May 15, 1962

3,034,779
VISE STRUCTURE FOR MACHINE TOOLS
Robert L. Crane, Hopkins, and Charles E. Cleland and Charles H. Whitmore, Minneapolis, Minn., assignors to Continental Machines, Inc., Savage, Minn., a corporation of Minnesota
Application Nov. 6, 1958, Ser. No. 772,256, which is a division of application Ser. No. 696,502, Nov. 14, 1957, now Patent No. 2,898,669, dated Aug. 11, 1959. Divided and this application Oct. 8, 1959, Ser. No. 845,240
7 Claims. (Cl. 269—142)

This invention relates to vise structures for machine tools and has more particular reference to a vise structure having hold-down means coacting with horizontally spaced upright jaws to firmly hold work on the work surface of a machine tool. The means for effecting relative movement between the jaws of said vise structure forms the subject of our copending application, Serial No. 772,256, filed November 6, 1958, now abandoned, of which this application is a division. Moreover, our copending application, Serial No. 772,256, was in turn a division of our then copending application, Serial No. 696,502, filed November 14, 1957, now Patent No. 2,898,669, which is directed to a metal cutting saw equipped with the vise structure of this invention.

Although the metal cutting saw of Patent No. 2,898,669 is a substantially large machine capable of performing sawing or cutting operations on work pieces such as metal bars having an extremely large cross section, on the order of 18" x 24" for instance, it is also useful for sawing bundles of bars having substantially smaller cross sections. Accordingly, as brought out in our said copending application, the vise structure for such a machine must comprise opposing jaws which are relatively translatable toward and from one another over a wide range of movement in order to be capable of firmly and immovably holding either the larger or the smaller cross section work pieces in position upon the work supporting surface of the machine during sawing.

Horizontally spaced and relatively movable jaws are incapable themselves, however, of holding down an irregularly shaped bar or a bundle of bars which may be inserted between the jaws of the vise for sawing. Accordingly, it is an object of this invention to provide a vise structure consisting of a stationary jaw and an adjustable jaw movable horizontally toward and away from said stationary jaw, along with holddown means for exerting downward force upon work between the jaws and which is always maintained centered between the vise jaws, regardless of the space therebetween.

It is another object of this invention to provide hold-down means of the character described which firmly holds work between a pair of vise jaws, against a work supporting surface, and wherein means connected between the jaws of the vise and the hold-down effects shifting of the latter, in consequence of relative adjusting motion of the movable vise jaw, in a direction and to an extent such as to maintain the hold-down centered with respect to the vise jaws.

More specifically, it is an object of this invention to provide a vise structure including a pair of jaws, one of which is adjustable, and hold-down means including a hydraulically operated pressure bar which is guided for up and down motion by the vise jaws and so connected with the jaws as to be automatically shifted and centered with respect to the space between the jaws, regardless of adjustment of the movable jaw.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 1 is a front elevational view of a power saw incorporating the vise structure of this invention;

FIGURE 2 is a sectional view taken through FIGURE 1 on the plane of the line 2—2;

FIGURE 3 is a sectional view taken through FIGURE 2 along the line 3—3;

FIGURE 4 is a detail sectional view taken through FIGURE 3 on the plane of the line 4—4;

FIGURE 5 is a fragmentary detail sectional view through FIGURE 3 on the plane of the line 5—5; and FIGURE 6 is a sectional view taken through FIGURE 3 on the plane of the line 6—6.

Referring now more particularly to the accompanying drawings, in which like numerals are applied to like parts, the numeral 8 designates generally the metal cutting power saw of Patent No. 2,898,669, the application for which was copending with our divisional application thereof, Serial No. 772,256, of which this application is in turn a division. Our copending application Serial No. 772,256 is directed to the means for effecting relative movement between the upright jaws of the vise structure 9, while this application is directed to the cooperative relation between the upright jaws and hold-down means of said vise structure, and more particularly to the means for maintaining the hold-down centered with respect to the upright jaws.

As brought out in greater detail in Patent No. 2,898,669, which may be referred to for a more complete disclosure, the power saw has a base 10, the top of which provides a horizontal work support 11. Supported by the base 10 is a movable saw head 12 having horizontally spaced pulleys 13 with an endless saw band trained thereover. One of the pulleys 13 is power driven by means not shown, and the other pulley is a freely rotatable idler.

A medial portion 14 of the upper stretch of the saw band is constrained to travel horizontally in a vertical plane, and constitutes the cutting stretch of the band, and the saw head 12 is supported from the base for bodily vertical translation to raise and lower the cutting stretch of the band in said vertical plane, from and toward the work support 11. Thus, work such as a bar 15 held in a fixed position on the work support between the jaws 16 and 17 of the vise structure, may be cut by the upper stretch 14 of the saw band during descent of the saw band.

The vise structure 9 includes upright horizontally spaced jaws 16 and 17. These jaws are located directly alongside the cutting plane occupied by the medial portion of the upper stretch of the saw band. While the jaws may be said to be mounted on the work support for relative horizontal motion toward and from one another, the jaw 16 is in fact secured to the work support. Both jaws, however, are slidably seated upon ways 18 extending across the table parallel to the cutting stretch of the saw band, and are guided for horizontal translating movement along these ways by tongues 19 on the underside of the jaws extending down into T slots 20 in the work support.

Each of the jaws has a substantially flat base 21 which flatwise seats upon the ways 18, and upright work clamping portions 22 on the bases rise upwardly from their adjacent ends. The fixed jaw 16 is adapted to be secured to the work support in either of two positions by means of removable pins 23, and the movable jaw 17 is power operated either toward or from the fixed jaw. A hydraulic operator 24 is provided to move the jaw 17.

The hydraulic operator 24, along with the means associated therewith to enable a short stroke operator to be used even though the jaws are movable relative to one another over a wide range, is claimed in our copending application, Serial No. 772,256, filed November 6, 1958, which application may be referred to for a more complete disclosure. Generally, however, the hydraulic operator 24 comprises a pair of extensible and retractable members, namely, a short stroke cylinder 25 and a piston rod 26 extending from the cylinder and connected to a piston inside the cylinder. In the interests of compactness, the cylinder, which constitutes the work performing element of the hydraulic operator, is provided by a cavity in the base 21 of the movable jaw, and the piston rod 26 projects therefrom away from the jaw in longitudinal alignment with and directly over a series of teeth 27 fixed on the work support. The teeth 27 are arranged in a row parallel to the path along which the movable jaw is constrained to travel, and they extend crosswise of said path. A double acting pawl 28 pivotally mounted on the end of the piston rod, as by a pin 29, cooperates with the teeth 27 to hold the piston rod against endwise movement in one direction or the other.

The pawl, therefore, is oscillatable in opposite directions about the axis of the pin 29, to each of a pair of operative positions at one of which, as shown in FIGURE 3, it engages a dog 30 on the pawl in any selected space between two adjacent teeth 27 to hold the piston rod connected to the work support while clamping pressure is exerted upon the movable jaw by the hydraulic operator. In the other position of the pawl the dog 30 is disconnected from the teeth and another dog 31 on the pawl is engageable in an adjacent tooth space to hold the piston rod connected to the work support while retracting motion is imparted to the movable jaw by the hydraulic operator. From this it will be seen that if the pawl is moved to a neutral position at which both of its dogs 30 and 31 are disengaged from the teeth or abutments 27 on the work support, the movable jaw may be freely moved manually back and forth upon its ways to any desired position of adjustment relative to the fixed jaw.

The opposite ends of the cylinder 25 are selectively connectible with a source of fluid pressure as by means of ducts 32 and 33, to thereby provide for relative extending and retracting motion of the cylinder and its piston rod.

The hold-down or clamp means of this invention, indicated generally by the numeral 35, may be used in coaction with the jaws 16 and 17 of the vise structure to hold irregularly or oddly shaped workpieces, or a bundle of rods to be simultaneously cut off to a given shorter length, firmly against the work surface. The hold-down comprises a hollow cross beam 36 slidably keyed to the tops of the jaws 16 and 17; a hydraulic cylinder 37 fixed to and extending up from the center of the cross beam with its piston rod or ram 38 projecting downwardly through a suitable hole in the cross beam; and a vertically movable pressure bar 39 connected to the ram 38 of the cylinder, long enough to span the distance between the jaws 16 and 17 in their widest position of adjustment. Preferably, the pressure bar has its ends slidably received in vertical slots 40 in the opposed upright portions 22 of the jaws, so as to be guided thereby for up and down motion toward and from the work support, and a block 41 fixed to the top of the bar, at its center, enables the bar to be pivotally connected to the ram, as by a cross pin 49, so that the bar can tilt in its guide slots and adjust itself with respect to work pieces beneath it.

The cross beam 36 which is slidably keyed to the tops of the jaws 16 and 17, is constrained to endwise reciprocatory motion in a horizontal path parallel to the path of motion of the movable jaw. It has a flat bottom wall 50 which is slidably seated, as at 51, upon flat uniplanar surfaces on the tops of the jaws, and the medial portion of its underside is cut away to define a longitudinal guide slot 52 extending the entire length of the beam. The cross beam is held against upward motion relative to the jaws by means of T-shaped keys, one on each jaw, having their heads 53 spanning the guide slot 52 and slidably engaging over machined surfaces on the inner face of the bottom wall 50, and their stems 54 secured to the tops of the jaws by means of screws 55. The stems 54 of the keys endwise abut the tops of the jaws, and they are snugly but slidably received in the guide slot 52 in the underside of the cross beam.

Thus, through controlled operation of the hydraulic cylinder 37, the pressure bar 39 may be forced down against work received between the upright jaws, to hold such work firmly against the work support and to thus cooperate with the jaws in holding the work against all motion relative to the work support.

A feature of the hold-down 35 is that it, and particularly its pressure cylinder 37, is always maintained in centered relation with respect to the jaws 16 and 17, despite adjustment of the spacing therebetween. This desirable result is obtained through the provision of a centering device consisting of an endless sprocket chain 42 trained about sprockets 43 freely rotatably journalled on stub shafts 44 fixed in the opposite end portions of the cross beam with their axes vertical. Hence, both stretches of the chain lie in a common horizontal plane, and one stretch 45 is connected, as at 46, to the top of the movable jaw 17, and the other stretch 47 is connected, as at 48, to the top of the fixed jaw 16. Thus, as the upright jaws 16 and 17 move relatively either toward or from each other, the sprocket chain is actuated to at all times hold the cross beam 36 in predetermined centered relation with respect to the jaws.

From the foregoing description together with the accompanying drawings, it will be readily apparent to those skilled in the art that this invention provides an improved vise structure featuring a power operated hold-down, for clamping and holding work in position between stationary and adjustable vise jaws, and a centering device which is operable in consequence of adjusting movement of the movable vise jaw to shift the hold-down and center the same with respect to the space between the jaws.

What is claimed as our invention is:

1. A vise structure for securely holding work on a horizontal work support while a machining operation is being performed on the work, comprising: a pair of horizontally spaced upright jaws on the work support; means fixing one of the jaws on the work support; cooperating guide means on the work support and the bottom portion of the other jaw constraining said other jaw to bodily movement in a horizontal path toward and from the fixed jaw; hold-down means including an elongated beam extending across the upper ends of the jaws; means connecting said beam with the upper ends of the jaws to constrain the beam to endwise horizontal motion relative to both jaws, parallel to the path of motion of the movable jaw, said hold-down means including a pressure bar carried by the beam at the underside thereof and positioned to engage against the top of work received between the jaws to thereby cooperate with the jaws in holding work upon the work support, said pressure bar being movable with the beam during endwise motion thereof relative to the jaws; means carried by the hold-down beam providing an actuator for imparting up and down motion to the pressure bar, said actuator having a work performing element operatively connected with the pressure bar; and means independent of the actuator for at all times maintaining the pressure bar centered with respect to the jaws, despite adjustment of the spacing therebetween, comprising a motion transmitting connection between the movable jaw and the hold-down beam.

2. A vise structure for securely holding work on a horizontal work support while a machining operation is being performed on the work, comprising: a pair of horizontally spaced upright jaws on the work support; means fixing one of the jaws on the work support; cooperating guide means on the work support and the other jaw constraining said other jaw to bodily movement in a horizontal path toward and from the fixed jaw; said jaws having vertical surfaces thereon which are parallel to the path of motion of the movable jaw and which are defined by vertically extending slots in the jaws; hold-down means including an elongated beam jointly carried by said jaws and connected across the upper ends of the jaws so as to be constrained to endwise horizontal motion parallel to the path of motion of the movable jaw, said hold-down means including a pressure bar carried by the beam at the underside thereof, spanning the jaws with its end portions slidably received in said slots to be constrained thereby to up and down translation and positioned to engage against the top of work received between the jaws to thereby cooperate with the jaws in holding work upon the work support; means carried by the hold-down beam providing an actuator for imparting up and down motion to the pressure bar, said actuator having a work performing element operatively connected with the pressure bar; and means for at all times maintaining the pressure bar centered with respect to the jaws, despite adjustment of the spacing therebetween, comprising a motion transmitting connection between the movable jaw and the hold-down beam.

3. A vise structure for securely holding work on a horizontal work support while a machining operation is being performed on the work, comprising: a pair of horizontally spaced upright jaws on the work support; means fixing one of the jaws on the work support; cooperating guide means on the work support and the other jaw constraining said other jaw to bodily movement in a horizontal path toward and from the fixed jaw; hold-down means including an elongated beam jointly carried by said jaws and connected across the upper ends of the jaws so as to be constrained to endwise horizontal motion parallel to the path of motion of the movable jaw, said hold-down means including a pressure bar carried by the beam at the underside thereof and positioned to engage against the top of work received between the jaws to thereby cooperate with the jaws in holding work upon the work support; means carried by the hold-down beam providing an actuator for imparting up and down motion to the pressure bar, said actuator having a work performing element operatively connected with the pressure bar; and means for at all times maintaining the pressure bar centered with respect to the jaws, despite adjustment of the spacing therebetween, comprising a pair of idler sprockets carried by the hold-down beam for free rotation about parallel axes fixed with respect to the beam and adjacent to each end thereof, an endless chain trained about said idler sprockets, and means connecting one stretch of said endless chain to one of said jaws and the other stretch of said chain to the other of said jaws.

4. In a metal cutting power saw, vise means to grip work as it is being cut, comprising: first and second horizontally spaced upright jaws; a base upon which said jaws are mounted; means to fix the first jaw to the base; cooperating guide means on the bottom portion of the second jaw and the base guiding said second jaw for bodily sliding movement toward and from the first jaw; means to effect bodily sliding movement of said second jaw toward and from the first jaw; hold-down means extending across the upright jaws, including a pressure head spanning the jaws to engage against the top of work received between the jaws; means connecting the hold-down means with the upper portions of the jaws to constrain the hold-down means to bodily motion relative to both jaws parallel to the path of movement of the second jaw; fluid pressure means for forcing said pressure head downwardly, said fluid pressure means being connected to the medial portion of the pressure head and being movable therewith; and means interconnecting the hold-down means with both of the upright jaws to at all times maintain the fluid pressure means thereof centered between the upright jaws in consequence of movement of said second jaw.

5. In a metal cutting power saw, vise means to grip work as it is being cut comprising: first and second horizontally spaced upright jaws; a base upon which said jaws are mounted; means to fix the first jaw to the base; cooperating guide means on the second jaw and the base guiding said second jaw for bodily sliding movement toward and from the first jaw; means to effect bodily sliding movement of said second jaw toward and from the first jaw; hold-down means connected to the upright jaws, including a pressure head spanning the jaws to engage against the top of work received between the jaws; fluid pressure means to force said pressure head downwardly, said fluid pressure means being connected to the medial portion of the pressure head; an idler sprocket fixed to each end of the hold-down means; and an endless chain trained about said idler sprockets and having one of its stretches connected to one of the upright jaws and its other stretch connected to the other upright jaw to thus interconnect the hold-down means with the upright jaws so as to maintain the fluid pressure means thereof at all times centered between the upright jaws, despite adjustment of the distance therebetween.

6. A vise structure for securely holding work on a horizontal work support while a machining operation is being performed on the work, comprising: a pair of horizontally spaced upright jaws on the work support; means securing one of said jaws to the work support; cooperating guide means on the work support and on the other of said jaws constraining the latter to bodily movement in a horizontal path toward and away from said one jaw; means for imparting adjusting movement to said other jaw; hold-down means extending across the upper portions of said jaws and having a member movable vertically to engage the top surface of work held between said jaws; means connecting the hold-down means with the upper portions of the jaws to constrain the hold-down means to bodily motion relative to both jaws along the path of adjusting movement of said other jaw; means connected with said movable member to impart vertical motion thereto; and traction means connecting the hold-down means with both jaws and operable in consequence of adjusting motion of said other jaw to shift the hold-down means horizontally in a direction tending to maintain the same centered with relation to the space between the jaws.

7. The vise structure of claim 1 further characterized by the fact that said actuator for the pressure bar comprises a hydraulic operator having an elongated cylinder mounted on the top of the hold-down beam and projecting upwardly from the medial portion of the beam, a piston in the cylinder, and an elongated piston rod connected at one end to the piston and at its other end with the pressure bar.

References Cited in the file of this patent

UNITED STATES PATENTS

| | | |
|---|---|---|
| 528,738 | Pfouts | Nov. 6, 1894 |
| 718,573 | Laval et al. | Jan. 13, 1903 |
| 914,299 | McCarthy | Mar. 2, 1909 |
| 1,281,161 | Hochstein | Oct. 8, 1918 |
| 2,043,366 | Bech | June 6, 1936 |